(12) United States Patent
Wang et al.

(10) Patent No.: US 11,915,296 B2
(45) Date of Patent: Feb. 27, 2024

(54) METHOD FOR PROVIDING ITEM INFORMATION AND APPARATUS FOR THE SAME

(71) Applicant: Coupang Corp., Seoul (KR)

(72) Inventors: Lei Wang, Seoul (KR); Yixun Zhou, Seoul (KR); Junjie Yang, Seoul (KR); Jun Young Mun, Seoul (KR); Hyang Eun Kim, Seoul (KR)

(73) Assignee: Coupang Corp., Seoul (KR)

( * ) Notice: Subject to any disclaimer, the term of this patent is extended or adjusted under 35 U.S.C. 154(b) by 114 days.

(21) Appl. No.: 17/562,561

(22) Filed: Dec. 27, 2021

(65) Prior Publication Data

US 2023/0038472 A1 Feb. 9, 2023

(30) Foreign Application Priority Data

Aug. 9, 2021 (KR) ........................ 10-2021-0104507

(51) Int. Cl.
*G06Q 30/00* (2023.01)
*G06Q 10/087* (2023.01)
*G06Q 30/0601* (2023.01)

(52) U.S. Cl.
CPC ....... *G06Q 30/0631* (2013.01); *G06Q 10/087* (2013.01); *G06Q 30/0633* (2013.01); *G06Q 30/0643* (2013.01)

(58) Field of Classification Search
CPC .................................................. G06Q 30/00
See application file for complete search history.

(56) References Cited

U.S. PATENT DOCUMENTS

| 2003/0001876 | A1  | 1/2003 | Lin et al. | |
|---|---|---|---|---|
| 2004/0107147 | A1* | 6/2004 | Uemura | G06Q 30/0643 |
| | | | | 705/26.81 |
| 2020/0012395 | A1* | 1/2020 | Gabbai | G06Q 30/0241 |
| 2021/0125264 | A1  | 4/2021 | Song et al. | |
| 2022/0189140 | A1* | 6/2022 | Woodbeck | G06V 10/82 |

FOREIGN PATENT DOCUMENTS

| CN | 109472672 A | 3/2019 |
|---|---|---|
| KR | 1020010057730 A | 7/2001 |
| KR | 1020060099377 A | 9/2006 |
| KR | 1020060120338 A | 11/2006 |
| KR | 101230034 B1 | 3/2013 |
| KR | 101509393 B1 | 4/2015 |
| KR | 101744320 B1 | 6/2017 |
| KR | 1020190114703 A | 10/2019 |
| KR | 1020200024534 A | 3/2020 |

(Continued)

OTHER PUBLICATIONS

Apr. 17, 2023—(TW) Office Action Appn 110136385.

*Primary Examiner* — Mark A Fadok
(74) *Attorney, Agent, or Firm* — Banner & Witcoff, Ltd.

(57) ABSTRACT

An item information providing method according to example embodiments may include checking a plurality of products corresponding to a search term received from a user who uses the service, and providing a first page that includes a first region in which a list of the plurality of products is displayed and a second region in which a filtering interface configured to filter the list of the plurality of products displayed in the first region according to a user's input is displayed.

10 Claims, 7 Drawing Sheets

(56) References Cited

FOREIGN PATENT DOCUMENTS

| KR | 1020210008180 A | 1/2021 |
| KR | 102249527 B1 | 5/2021 |
| TW | 508518 B | 11/2002 |
| WO | 2006123901 A1 | 11/2006 |
| WO | 2016089744 A1 | 6/2016 |

\* cited by examiner

METHOD FOR PROVIDING ITEM INFORMATION AND APPARATUS FOR THE SAME

This application claims the benefit of Korean Application No. 10-2021-0104507, filed Aug. 9, 2021. The present application claims priority to and the benefit of the above-identified application and patent and the above-identified application and patent are incorporated by reference herein in its entirety.

TECHNICAL FIELD

The present disclosure relates to an item information providing method, an electronic apparatus therefor, and a storage medium therefor. More specifically, the present disclosure relates to a method of checking a stock of an item that matches a selectable characteristic such that a user who uses a service can purchase the item he/she wants, an apparatus therefor, and a storage medium therefor.

DESCRIPTION OF THE RELATED ART

As the use of the Internet has become common, users have been able to obtain various pieces of information through Internet searches. That is, each user can access an Internet search site using a terminal device such as an individual computer capable of accessing the Internet to search for various contents relating to news, knowledge, games, communities and the like.

In addition, with the development of Internet technologies, the number of consumers who purchase goods through the Internet has also increased. Accordingly, efforts are actively being made to introduce functions for enabling the user to easily purchase goods he/she wants.

As a document in the related art associated with the above, there is Korean Patent Application Publication No. 10-2020-0024534 (Mar. 9, 2020).

DISCLOSURE OF THE INVENTION

Some example embodiments of the present disclosure provide an item information providing method and an apparatus therefor.

More specifically, some example embodiments of the present disclosure provide a method of checking a stock of an item that matches a selectable characteristic such that a user who uses a service can purchase the item he/she wants, and an apparatus therefor.

According to example embodiments of the present disclosure, a method of providing search result information for a service provided using an electronic apparatus, may include: checking a plurality of products corresponding to a search term received from a user who uses the service; and providing a first page that includes a first region in which a list of the plurality of products is displayed and a second region in which a filtering interface configured to filter the list of the plurality of products displayed in the first region according to an user's input is displayed. In example embodiments, each of the plurality of products may include one or more items which are distinguished from each other based on characteristic information, and the filtering interface may include a list associated with selectable characteristic information determined based on stock information of each of the one or more items of each of the plurality of products.

In example embodiments, the method may further include: in response to a selection input by the user for the selectable characteristic information, displaying, in the first region of the first page, a list of products among the plurality of products in which an item that matches the characteristic information corresponding to the selection input is in stock.

In example embodiments, the displaying the list of the products in which the item that matches the characteristic information corresponding to the selection input is in stock, may include: checking a product identifier of each of the plurality of items corresponding to the search term; and checking an item identifier of the item that matches the characteristic information corresponding to the selection input among item identifiers that identify items corresponding to the product identifier, and checking the products in which the item corresponding to the item identifier is in stock.

In example embodiments, the filtering interface may include at least one detail interface configured for the service user to select pieces of characteristic information associated with a most-product category relating to the most of the plurality of products corresponding to the search term.

In example embodiments, the second region may further include an icon indicating a detail interface for characteristic information corresponding to information about the user among the pieces of characteristic information associated with the most-product category, and the information about the user may include information indicating a size of a body portion of the user.

In example embodiments, when there is no product in which the item that matches the characteristic information corresponding to the selection input is in stock, among the plurality of products, one or more products in which the item is in stock may be displayed in the first region.

In example embodiments, when there is no product in which the item that matches the characteristic information corresponding to the selection input, among the plurality of products, one or more products corresponding to a preferable brand the user prefers may be displayed in the first region, and the preferable brand may be determined based on pieces of information indicating an item purchase history and item search history included in the information about the user.

In example embodiments, when there is no product in which the item that matches the characteristic information corresponding to the selection input, the first region may include a date of receipt of the item that matches the characteristic information corresponding to the selection input, and the first region may further include a second interface configured to provide a notification about the date of receipt to the terminal device of the user.

In example embodiments, the method may further include providing a second page indicating detail information of the item that matches the characteristic information corresponding to the selection input in response to a request of a detail page for a first product included in the first region.

An electronic apparatus according to example embodiments makes it possible for a service user to find out goods with a property he/she wants in an efficient manner using a filtering interface, thus preventing the service user from wasting time to check out-of-stock goods that are not currently available for purchase.

An electronic apparatus according to example embodiments is configured to include a visible filtering interface with which a service user can first filter a property he/she wants before checking a specific goods. This configuration makes it possible for the service user to easily check and search goods he/she wants.

An electronic apparatus according to example embodiments is configured to include an indicator indicated with respect to a specific characteristic within the filtering interface. This makes it possible for a service user to easily find the best goods for him/her, thus reducing an unnecessary load borne by the user.

An electronic apparatus according to example embodiments makes it possible for a service user to request a notification about a restock of an item with a property he/she wants. Thus, the electronic apparatus can clearly present when the service user can purchase the item he/she wants. This helps the service user to make purchase decision about the item.

Even if a search result does not match a search term input by a service user and a product characteristic selected by the service user, an electronic apparatus according to example embodiments can present an item that the service user is likely to purchase, or can provide information on when the service user can purchase an item that matches the product characteristic he/she has selected. This can help the service user to make purchase decision about the item, and can induce the service user to purchase another product.

DETAILED DESCRIPTION OF THE INVENTION

Hereinafter, example embodiments of the present disclosure will be described in detail with reference to the accompanying drawings.

Technical contents that are well known in a technical field to which the present disclosure pertains and are not directly related to the present disclosure will be omitted in describing example embodiments. This is to more clearly describe the gist of the present disclosure by omitting unnecessary description.

Further, in the accompanying drawings, some of constituent elements are illustrated on a large scale, omitted, or schematically illustrated. In addition, the size of each constituent element does not fully reflect the actual size. In each drawing, the same or corresponding elements will be indicated by the same reference numerals.

Advantages and features of the present disclosure, and a method of achieving them, will become more apparent by example embodiments described below in detail in conjunction with the accompanying drawings. However, the present disclosure is not limited to example embodiments which will be described later, and may be implemented in various different forms. The present example embodiments only completely describe the present disclosure, and are provided to faithfully explain the scope of the present disclosure to those skill in the art to which the present disclosure pertains. The present disclosure is only defined by the scope of the claims. Throughout the specification, like reference numerals refer to like constituent elements.

Further, it will also be understood that each block in process flowchart figures and combinations of the process flowchart figures may be executed by computer program instructions. These computer program instructions may be incorporated in a processor of a general-purpose computer, a special-purpose computer, or other programmable data processing equipment. The instructions, when executed by the processor of such computers or other programmable data processing equipment, may implement means for performing functions described in the block(s) in the flowchart figures. These computer program instructions may be stored in a computer-usable or computer-readable memory that may oriented to the computer or other programmable data processing equipment to implement functions in a particular manner. Thus, the instructions stored in the computer-usable or c memory may produce a manufacture article incorporating instruction means for performing the functions described in the block(s) of the flowchart figures. The computer program instructions may be incorporated in the computer or other programmable data processing equipment so that a series of operational steps are performed on the computer or other programmable data processing equipment to implement processes executed by the computer. Thus, the instructions that operate the computer or other programmable data processing equipment may also provide operations of executing the functions described in the block(s) in the flowchart figures.

In addition, each block may represent a portion of a module, segment, or code that includes one or more executable instructions for executing assigned logical function(s). Further, it should also be noted that in some alternative implementations, the functions recited in the blocks may be executed in a non-sequence manner. For example, two successive blocks may be executed substantially in parallel or may be executed in the reverse order according to their functions.

In addition, the term "~part" used in this example embodiment may refer to software or a hardware constituent element such as a field-programmable gate array (FPGA) or an application specific integrated circuit (ASIC). The "~part" may perform a certain role. However, the "~part" is not limited to software or hardware. The "-part" may be configured to be included in an addressable storage medium, or configured to reproduce one or more processors. Thus, as an example, the "~part" may include constituent elements such as software constituent elements, object-oriented software constituent elements, class constituent elements and task constituent elements, processes, functions, properties, procedures, subroutines, segments of program codes, drivers, firmware, microcode, circuits, data, databases, data structures, tables, arrays, and variables. The functions provided by the constituent elements and the "~parts" may be combined with a smaller number of constituent elements and "~parts" or may further be divided into additional constituent elements and "~parts". Besides, the constituent elements and "~parts" may be implemented to play one or more CPUs in a device or security multimedia card.

Figure 1:
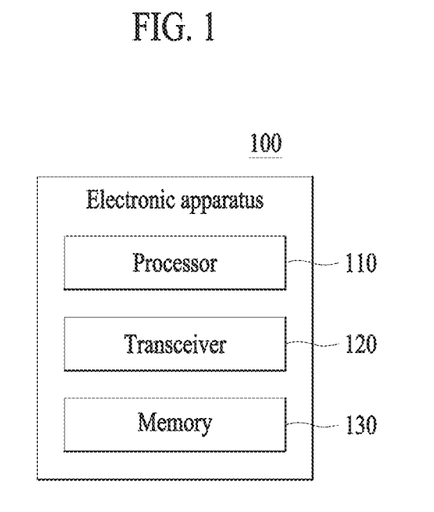
FIG. 1 exemplarily illustrates internal constituent elements of an electronic apparatus according to example embodiments.

FIG. 1 exemplarily illustrates internal constituent elements of an electronic apparatus according to example embodiments.

Referring to FIG. 1, internal constituent elements of an electronic apparatus 100 are not limited to only those illustrated herein. The electronic apparatus 100 may include at least one of a processor 110, a transceiver 120, and a memory 130.

The processor 110 may process a series of steps for implementing an item information providing method according to various example embodiments of the present disclosure. The processor 110 may control other constituent elements of the electronic apparatus 100. Further, in an example embodiment, goods may be used as a term to refer to a specific item, and such an item may be sold to a user who uses a service associated with the electronic apparatus 100.

The processor 110 performs a service for implementing an item information providing method according to example embodiments. The item information providing method according to example embodiments may include: checking a plurality of products corresponding to a search term received from a user who uses the service; and providing a first page including a first region that displays a list of the plurality of the products and a second region that displays a filtering interface for filtering the list of the plurality of products in the first region according to a user's input. According to some example embodiments, each of the plurality of products includes at least one item which are distinguished from each other based on characteristic information. Further, according to example embodiments, the filtering interface includes a list associated with selectable characteristic information determined based on stock information of each item of the plurality of products. A program or computer-readable instructions to be executed by the processor 110 may be stored in the memory 130 in advance or received from the outside via the transceiver 120. The processor 110 may provide the first page to a display of the electronic apparatus 100.

In the electronic apparatus 100, the transceiver 120 may perform a function of transmitting information stored in the memory 130 or information processed by the processor 110 to another apparatus, or receiving information from another apparatus.

The memory 130 may be configured to be provided in a certain storage space inside the electronic apparatus 100, and may include a database in which functions such as data storage, data retrieval, data deletion, data edit, data addition or the like may be freely executed. For example, the memory 130 may include fields or constituent elements for processing the functions such as data storage, data retrieval, data deletion, data edit, data addition or the like. The memory 130 may store data necessary for the electronic apparatus 100 to carry out the information providing method based on a service. For example, the memory 130 may store instructions or pieces of data for executing the operation of the processor 110. The memory 130 according to example embodiments may include a database for storing item information and the like.

Figure 2:
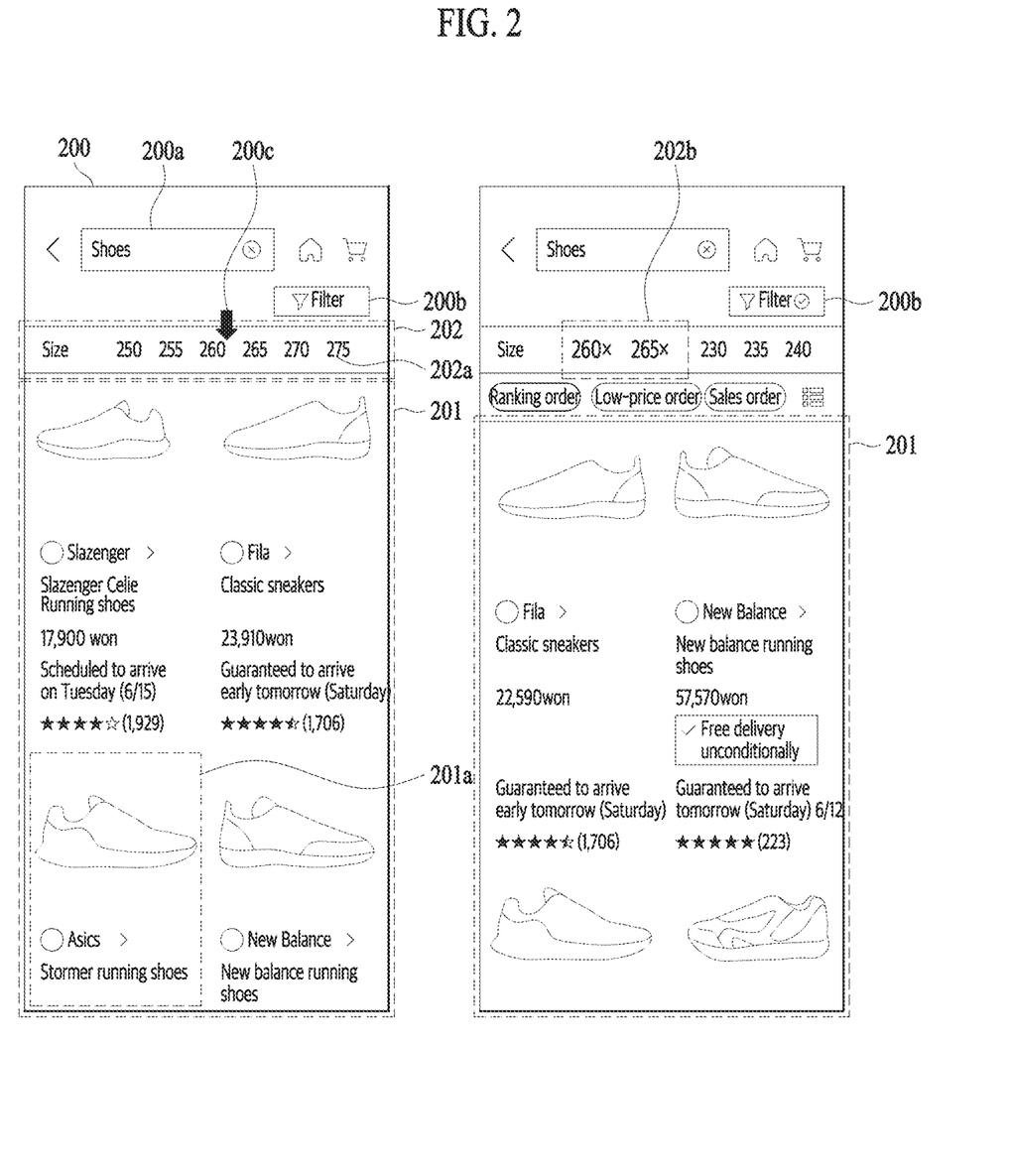
FIG. 2 illustrates an example of a search result page provided by the electronic apparatus according to example embodiments.

FIG. 2 illustrates an example of a search result page provided by the electronic apparatus according to example embodiments.

A search result page 200 according to example embodiments illustrated in FIG. 2 may be referred to as the first page. Some or all of operations illustrated in FIG. 2 may be performed in the electronic apparatus 100 illustrated in FIG. 1.

The electronic apparatus 100 according to example embodiments may receive a search term 200a from a terminal device of the user (service user) who uses the service associated with the electronic apparatus 100. The search term 200a may mean a search word input by the user to purchase a desired item. The electronic apparatus 100 according to example embodiments may use the search term 200a to check the plurality of products corresponding thereto. The electronic apparatus 100 may transmit the first page 200 in which the plurality of products is displayed to the terminal device of the user.

The first page 200 may include a first region 201 in which the list of the plurality of products corresponding to the search term 200a input by the service user is displayed.

The term "product" is a concept that classifies goods, for example, which may be sold to the service user or searched by the service user. The product that may be sold to the service user or searched by the service user may include a plurality of items according to a characteristic of the product. The characteristic may refer to a criterion for classifying a specific product according to a difference in properties inherent in the specific product. One product may be classified into a plurality of items based on the characteristic thereof. That is, one product may include a plurality of items, and the item may be understood as a concept that is classified within the one product according to the characteristic of the one product.

For example, the product may be assumed to be shoes of a model A. In this case, the product, which is the shoes of the model A, may include a plurality of items that are distinguished from each other based on characteristic such as various shoe sizes. For example, the product, which is the shoes of the model A, may include a first item with the property of "shoe size of 250 mm", a second item with the property of "shoe size of 260 mm", and the like.

As described above, one characteristic may include, for example, a property and a value relating to the property. For example, the characteristic of "shoe size of 250 mm" may include the property of "shoe size" and the value of "250 mm".

The first region 201 may include a product region 201a in which information about each product is displayed. The product region 201a may include at least one of an image or a moving image representing the product, a name, a discounted price, a price before discount, delivery-related information, and review information of the product.

Further, the service user may purchase an item satisfying a characteristic he/she wants, and may confirm a product of the respective item to purchase the respective item satisfying the characteristic he/she wants. However, in a case in which the electronic apparatus 100 presents all of a plurality of products corresponding to a search term on the first region 201, the service user may query a product including no item that matches the characteristic he/she wants, or a product in which the item that matches the characteristic he/she wants is out of stock. In this case, the service user may check later that the currently-presented product is one that does not include the item satisfying the characteristic he/she wants, or one in which the item satisfying the characteristic he/she wants is out of stock. For this reason, the service user may go through a cumbersome process of performing the search again or checking the searched product again.

Accordingly, the electronic apparatus 100 according to example embodiments may provide the service user with a filtering interface configured to filter, among the plurality of products corresponding to the search term, products that do not include the item satisfying the characteristic he/she wants, or products in which the item satisfying the characteristic he/she wants is out of stock, while being to be included in the first page 200.

Further, the electronic apparatus 100 according to example embodiments may store a stock quantity of each of the plurality of items that are distinguished from each other according to the characteristic of one product. For example, in storing the data about the stock quantity of the product as the shoes of the model A, the electronic apparatus 100 may store a stock quantity of the first item with the property "shoe size of 250 mm", a stock quantity of the second item with the property "shoe size of 260 mm", and the like in a separate manner.

The first page 200 according to example embodiments may include a second region 202*a* in which the filtering interface described above is provided. The second region 202*a* may include the filtering interface which is capable of filtering the plurality of products corresponding to the search term 200*a* input by the service user based on the characteristics of the products. For example, the electronic apparatus 100 may check a characteristic selected by the service user based on data input to the filtering interface by the service user, and may check a stock quantity of an item that satisfies the respective characteristic in each product displayed on the first page 200. Thereafter, the electronic apparatus 100 may filter only the product with the item in stock among the products displayed on the first page 200, and display the same on the first region 201.

The filtering interface may display, for example, characteristics relating to a product category (most-product category) that includes the most of the plurality of products corresponding to the search term 200*a* input by the service user. For example, as a result of searching with the search term 200*a* input by the service user, most products that corresponds to a shoe category among the products displayed on the first region 201, may be included in the filtering interface. In this case, the electronic apparatus 100 may display characteristics relating to the shoe category (for example, shoe sizes) on the second region 202.

The second region 202 may include first detail interfaces 202*a* for selecting the characteristics relating to the most-product category. The first detail interfaces 202*a* may display, for example, values that may indicate properties constituting the characteristic relating to the most-product category. For example, the first detail interface 202*a* may display, for example, 250 mm, 255 mm, 260 mm, and the like, which are values that may indicate the shoe sizes as properties.

When the service user selects at least one of the first detail interfaces 202*a*, the selected first detail interface(s) may be displayed at a location 202*b* that can be viewed by the service user even if the service user does not perform a scroll operation.

The electronic apparatus 100 according to example embodiments may efficiently find the product with the property the service user wants, and may prevent the service user from wasting time to check out-of-stock products that are not currently available for purchase.

In addition, the electronic apparatus 100 according to example embodiments is configured to include the visible filtering interface. Thus, the service user may first filter the property he/she wants before checking a specific goods. This makes it possible for the service user to easily check and search goods he/she wants. In particular, the electronic apparatus 100 according to example embodiments may include an indicator indicated with respect to a specific characteristic within the filtering interface. This makes it possible for the service user to easily find the best goods for him/her, thus reducing an unnecessary load borne by the service user.

The first page 200 according to example embodiments may further display an icon (first indicator) indicating a characteristic suitable for the service user among the characteristics of the product illustrated on the second region 202, based on service information about the user. The service information about the user may include, for example, the gender and the size of a body portion of the service user, and may also include a brand of a product that the service user prefers, a color that the service user prefers, and the like based on a purchase history of the service user.

For example, the electronic apparatus according to example embodiments may check information indicating the size of the foot among the body portions of the service user from the service information about the user. The electronic apparatus 100 may check the characteristic of the product suitable for the service user using the information indicative of the size of the foot of the service user. Further, a first indicator 202*c* according to example embodiments may be displayed in a second interface indicative of the characteristic of the product suitable for the service user. The first indicator 202*c* may be provided in various patterns.

The electronic apparatus according to example embodiments may further include a filter setting interface 200*b* for setting in detail various characteristics relating to the product category that includes the most products (the most-product category). When the service user clicks the filter setting interface 200*b* according to example embodiments, the electronic apparatus 100 may provide a page for setting in detail various characteristics relating to the most-product category to the terminal device of the service user. For example, when the most-product category is a shoe category, the filter setting interface 200*b* may provide the terminal device of the service user with the page for setting various characteristics in detail with properties such as a color, type and the like of the shoes as well as a size of the shoes.

In response to a selection input made by the service user with respect to the characteristic information selectable from the filtering interface in the second region 202 of the first page 200, the electronic apparatus 100 according to example embodiments may display, on the first region 201 of the first page 200, a list of products among the plurality of products in which an item with the characteristic information corresponding to the selection input is in stock. For example, the service user may make an input to select a specific characteristic in order to filter characteristics of a specific product from the filtering interface using his/her terminal device. Upon receiving the input, the electronic apparatus 100 may check characteristics corresponding to the input received from the terminal device, and may extract products including a stocked item that matches the specific characteristic. The electronic apparatus 100 may display a list of extracted products on the first region 201.

In order to extract the products in which the item matching the specific characteristic, the electronic apparatus 100 according to example embodiments may first check a product identifier of each product corresponding to a search term input by the service user. The electronic apparatus 100 according to example embodiments may check an item (for example, an item that matches the characteristic input by the service user) that satisfies a filtering condition associated with the filtering among items corresponding to each product identifier. That is, the electronic apparatus 100 may check an item identifier that satisfies the filtering condition associated with the filtering among item identifiers that identifies items corresponding to each product identifier. Subsequently, the electronic apparatus 100 may check the products including the stocked item that satisfies the filtering condition based on the checked item identifier and the selection input made by the service user according to example embodiments.

Figure 3:
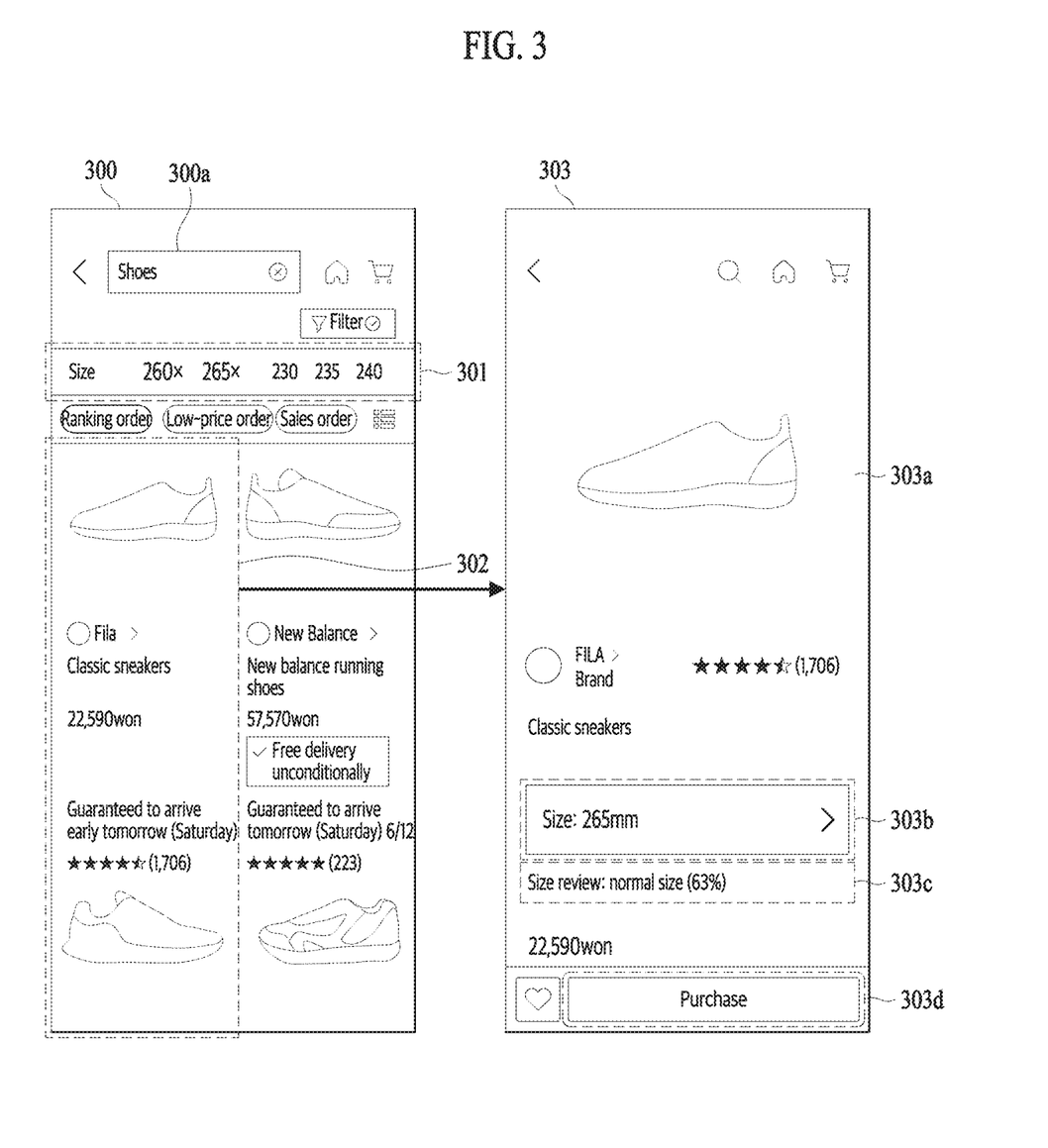
FIG. 3 illustrates an example of a search result page provided by the electronic apparatus according to example embodiments.

FIG. 3 illustrates an example of the search result page provided by the electronic apparatus according to example embodiments.

A search result page 300 according to example embodiments described with reference to FIG. 3 may be referred to as a first page, which may correspond to the first page 200 illustrated in FIG. 2. Some or all of operations to be described with reference to FIG. 3 may be performed in the same manner as in the electronic apparatus 100 described with reference to FIGS. 1 and 2.

Upon receiving a search term 300a input by the service user, the electronic apparatus 100 according to example embodiments may check a plurality of products corresponding to the search term 300a, and may provide the terminal device of the service user with the first page 300 that includes a first region 302 representing a list of products and a second region 201 according to example embodiments.

The electronic apparatus 100 according to example embodiments may provide a product detail page 303 according to example embodiments illustrated in FIG. 3 in response to a request of a detail page 303 of an item from the service user. For example, the product detail page 303 may be provided to the service user when the service user clicks the first region 302 representing the product in the first page 300. The product detail page 303 may be referred to as, for example, a second page 303.

The second page 303 according to example embodiments may include a region 303a in which an image or moving image representing the respective product is displayed, an information region in which information about the respective product is displayed, a characteristic selection region 303b in which the service user selects a characteristic he/she wants in the respective product to purchase an item that matches the characteristic, a review information region 303c in which information indicative of reviews of buyers on the characteristic of the respective product is included.

In other words, one product may include one or more items according to a characteristic of the respective product. For example, a product corresponding to shoes may include a shoe item with a size of 260 mm, a shoe item with a size of 265 mm, a shoe item with a size of 270 mm, and the like according to a size characteristic of the shoes. The characteristic selection region 303b of the second page 203 according to example embodiments may include an interface for selecting a characteristic in the product selected by the service user. For example, when the service user clicks the characteristic selection region 303b, the second page 203 may provide the service user with a third page or layout in which the service user may select the characteristic in the selected product. Then, when the service user selects the characteristic in the selected product, the electronic apparatus 100 according to example embodiments may check an item in the product that satisfies the characteristic selected by the service user, and may check a stock quantity of the item to check whether or not the service user can purchase the item that satisfies the selected characteristic. The second page 303 may indicate whether or not the service user can purchase the item that satisfies the characteristic he/she has chosen.

In the case in which the service user can purchase the item that satisfies the selected characteristic, the second page 203 according to example embodiments may further provide a purchase interface 303d through which the service user selects a purchase of the item.

The electronic apparatus 100 according to example embodiments makes it possible for the service user to find out goods with a property he/she wants in an efficient manner using the filtering interface, and prevents the service user from wasting time to check out-of-stock goods that are not currently available for purchase.

Figure 4:
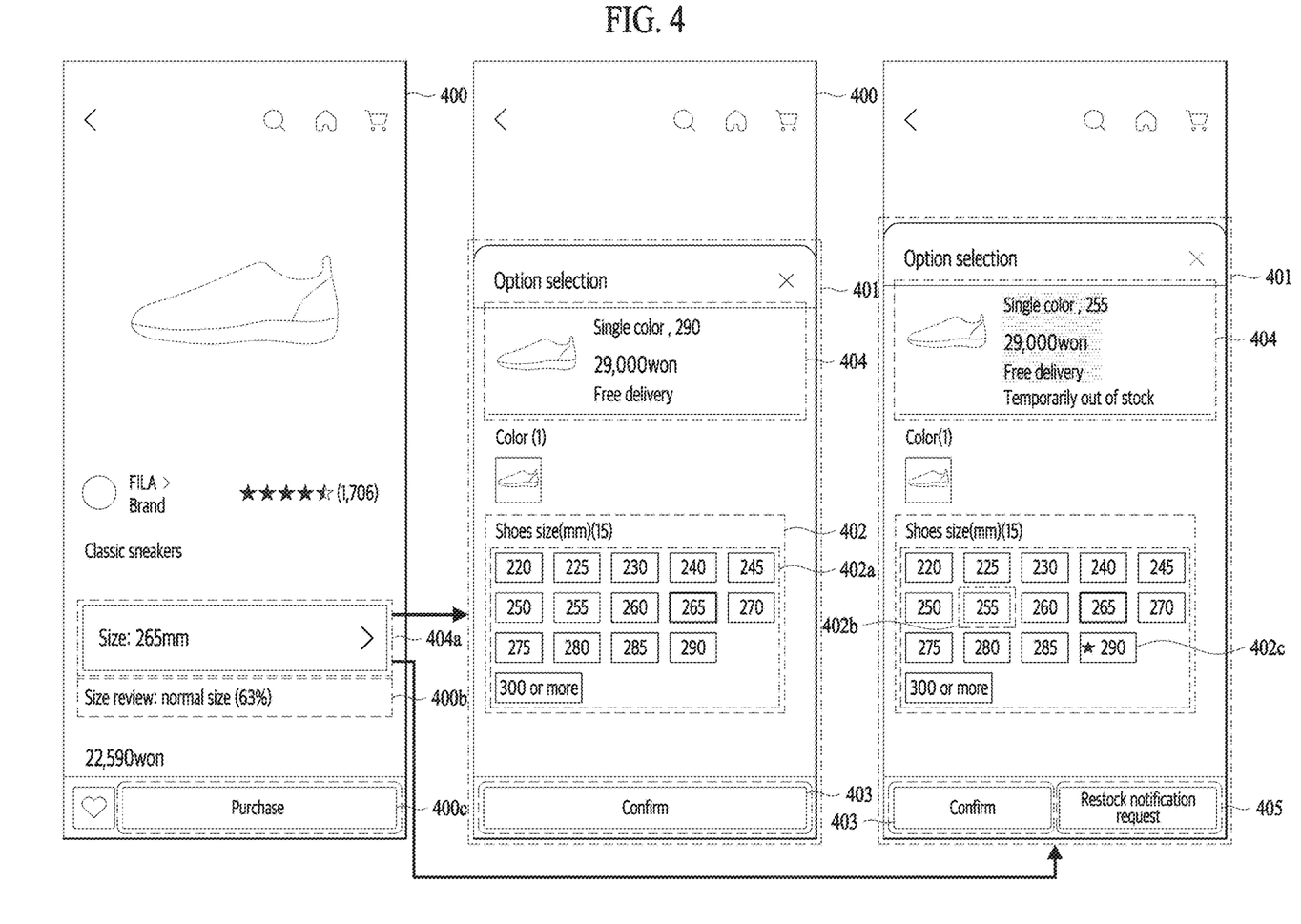
FIG. 4 illustrates an example of a product detail page of an item corresponding to a product and an example of an operation of filtering the item in the product, according to example embodiments.

FIG. 4 illustrates an example of a product detail page of items corresponding to a product and an example of an operation of filtering the items in the respective product, according to example embodiments.

FIG. 4 illustrates a second page 400 according to example embodiments. The second 3, which may be referred to as a product detail page.

Referring to FIG. 4, the second page 400 represents information about the product selected by the service user. The second page 400 according to example embodiments may include a characteristic selection region 400a in which the service user selects a characteristic he/she wants in the respective product to purchase an item that matches the characteristic, a review information region 400b in which information indicative of reviews of buyers on the characteristic of the respective product is included, and a purchase interface 400c.

The characteristic selection region 400a according to example embodiments may include an interface through which the service user selects a characteristic in the product he/she has selected. For example, when the service user clicks the characteristic selection region 303b, the second page 400 may provide the service user with a characteristic selection page 401 in which the service user can select the characteristic in the selected product. The characteristic selection page 401 may also be referred to as a third page 401.

The third page 401 according to example embodiments may be displayed on a screen of the terminal device of the service user while overlapping the second page 400. The third page 401 may be displayed on the second page 400 so as to cover the entire second page 400, or may be displayed on the second page 400 so as to cover only a portion of the second page 400.

The third page 401 may include interfaces for establishing characteristic(s) of the product selected by the service user. The third page 401 may include a region in which a property of the product selected by the service user is displayed, and a second detail interfaces 402a for selecting values of the respective property. The second detail interface 402a may be interfaces in which the values of the respective property are displayed. The service user may select one or more of the second detail interfaces 402a.

The electronic apparatus 100 according to example embodiments may check stock quantities of items that satisfy the characteristics of the product selected by the service user. The electronic apparatus 100 may check a characteristic of an out-of-stock item among the items that satisfy the characteristics of the product, and may shade or translucently display the respective second detail interface that indicates the characteristic of the out-of-stock item. For example, in a case in which the electronic apparatus 100 checks that an item with a shoe size of 250 mm and an item with a shoe size of 255 mm are out of stock, the electronic apparatus 100 may shade or translucently display the respective second detail interfaces.

The third page 401 may further include a third region 404 that provides information about the item corresponding to the characteristic selected by the second detail interface selected by the service user. The third region 404 may include a name, price, image or moving image, and information relating to the delivery of the item the item corresponding to the characteristic selected by the service user.

The third page 401 may further include a confirmation interface 403 for setting the item that matches the characteristic selected through the second detail interface selected by the service user.

On the other hand, in the third page 400, there may be a case in which an item that satisfies a characteristic of one second detail interface selected by the service user among the second detail interfaces 402a is out of stock (that is, a case in which the service user has selected a second detail interface 402b corresponding to a characteristic of an out-of-stock item). In this case, the third region 404 of the third page 401 may further display information indicating that the item is out of stock (for example, the phrase of "temporarily out of stock"), and the item information (for example, the name, price, and the like of the item) may be displayed translucent.

Further, in the case in which an item that satisfies a characteristic of one second detail interface selected by the service user among the second detail interfaces 402a is out of stock, the third page 400 may further include a restock notification request interface 405 for requesting a notification at the time of restocking the item. For example, when the service user clicks the restock notification request interface 405, the electronic apparatus 100 may notify the terminal device of the service user that the item corresponding to the characteristic selected by the service user is restocked in the fulfillment center.

The third page 401 according to example embodiments may further display a second indicator 402c in a second detail interface 402 associated with the characteristic that matches the service information about the user, based on the service information about the user. The service information about the user may include, for example, the gender and the size of a body portion of the service user, and may also include a brand of a product that the service user prefers, a color that the service user prefers, and the like based on a purchase history of the service user.

For example, the electronic apparatus 100 according to example embodiments may check information indicating the size of the foot among the body portions of the service user from the service information about the user. The electronic apparatus 100 may check the characteristic of the product suitable for the service user using the information indicating the size of the foot of the service user. Further, the second indicator 402c according to example embodiments may be further displayed in the second interface 402 indicative of the characteristic of the product suitable for the service user. The second indicator 402c may be provided in various patterns.

The electronic apparatus 100 according to example embodiments makes it possible for the service user to find out a product with a property he/she wants in an efficient manner by using the detail interfaces of the third page and the method of displaying the respective detail interface, thus preventing the service user from wasting time to check out-of-stock goods that are not currently available for purchase.

The electronic apparatus 100 according to example embodiments makes it possible for the service user to request the notification about the restock of an item with a property he/she wants. Thus, the electronic apparatus 100 can clearly present when the service user can purchase the item he/she wants. This helps the service user to make purchase decision about the item.

Figure 5:
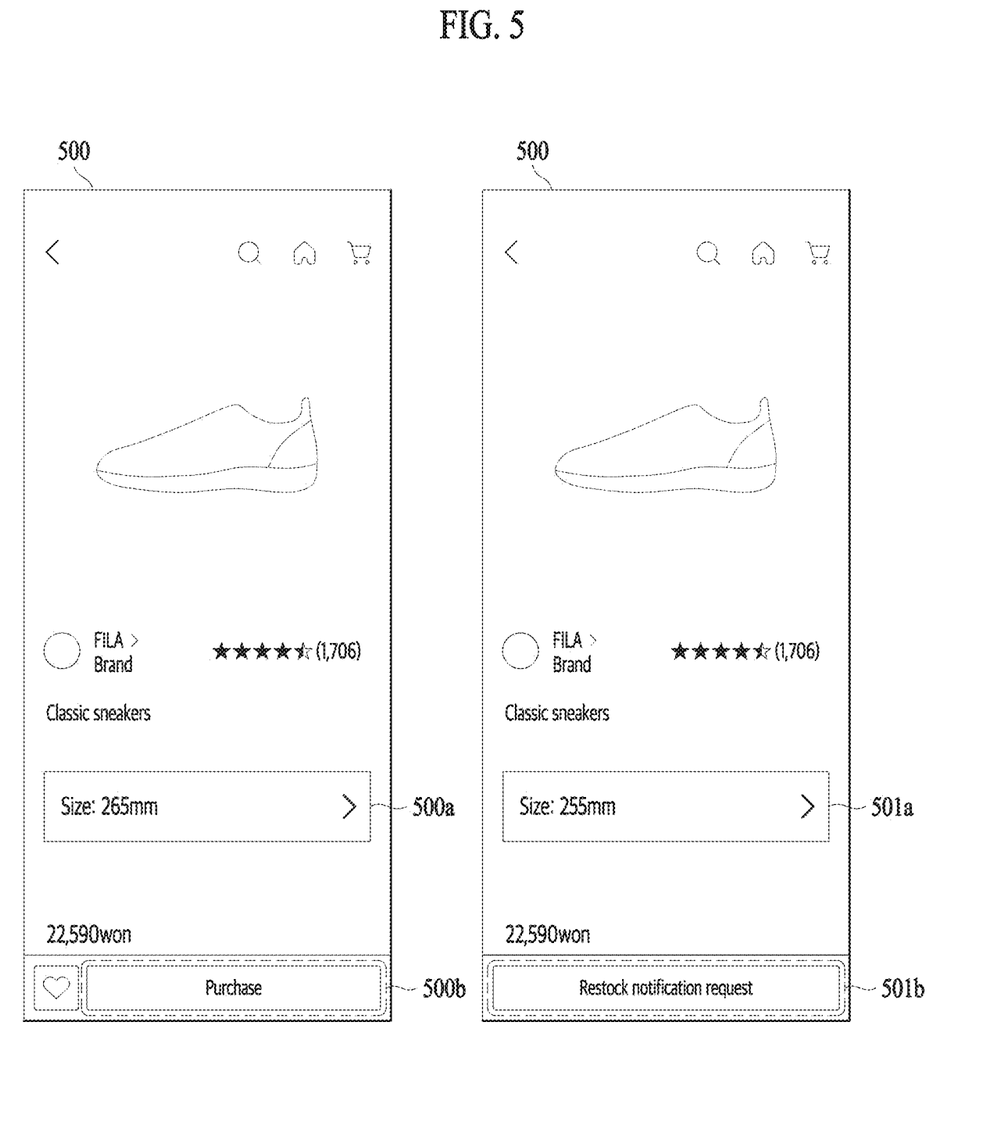
FIG. 5 illustrates an example of a product detail page of an item corresponding to a product according to example embodiments.

FIG. 5 illustrates an example of a product detail page of an item corresponding to a product according to example embodiments.

Specifically, FIG. 5 illustrates a second page 500 corresponding to a characteristic selected by the service user. The second page 500 may refer to, for example, the second pages illustrated in FIGS. 2 to 4.

The second page 500 may include an image or moving image indicating the product selected by the service user (or the item corresponding to the characteristic selected by the service user), a name, price, and the like of the product selected by the service user (or the item corresponding to the characteristic selected by the service user). The second page 500 may further include a characteristic selection region 500a in which the service user selects the characteristic of the product. The characteristic selection region 500a may refer to the characteristic selection region 400a in FIG. 4, and may include an interface that represents a third page according to example embodiments for selecting the characteristic of the product.

Further, the service user may click the characteristic selection region 400a to select the characteristic of the product through the third page according to example embodiments. The electronic apparatus 100 according to example embodiments may check the stock of the item that satisfies the characteristic of the product selected by the service user. However, when the items that satisfies the characteristic of the product selected by the service user is out of stock, the service user cannot directly purchase the item. Thus, the electronic apparatus 100 according to example embodiments may check whether or not the service user wants to receive a notification at the time of restocking the item.

For example, when the item that satisfies the characteristic selected by the service user through the interface of the characteristic selection region 400a is in stock, the third page 500 may further include a purchase interface 500b for purchasing the item. On the other hand, when the item that satisfies the characteristic selected by the service user through the interface of the characteristic selection region 400a is out of stock, the second page 500 may further include a restock notification request interface 501b for requesting a notification at the time of restocking the item.

When the service user clicks the restock notification request interface 501b to be notified that the item is restocked, the electronic apparatus 100 may transmit a notification message to the terminal device of the service user at the time when the item is restocked.

Figure 6:
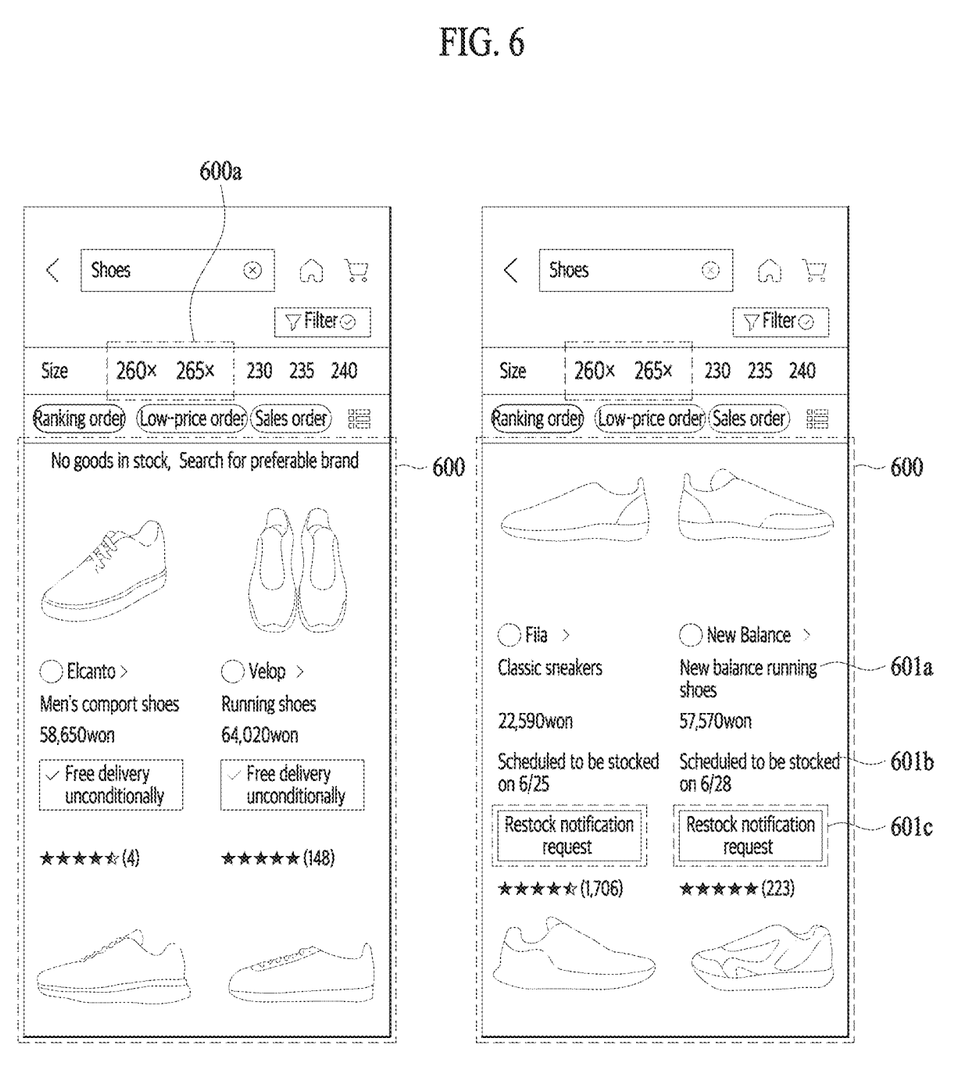
FIG. 6 illustrates a search result page representing products that have been subjected to a filtering according to example embodiments.

FIG. 6 illustrates a search result page representing products that have been subjected to the filtering according to example embodiments.

Specifically, FIG. 6 illustrates a method in which the electronic apparatus 100 displays a first region 600 when the service user selects a product characteristic 600a and there is no item that matches the product characteristic 600a. The electronic apparatus 100 according to example embodiments may check whether the item that matches the product characteristic 600a selected by the service user is in stock or out of stock.

When there is no product in which the item that matches the product characteristic 600a selected by the service user is in stock, the electronic apparatus 100 according to example embodiments may display products corresponding to a brand the service user prefers on a first region 600. For example, there may be a case in which the service user searches for products of a shoe category and selects the product characteristic 600a indicating a shoe with "a shoe size of 260 mm" or "a shoe size of 265 mm" among characteristics relating to the shoe category, but an item that matches the product characteristic 600a and be in stock is not searched. In this case, the first region 600 of the first page may display products corresponding to a brand the service user prefers, in addition to the phase indicating "No item in stock".

The brand the service user prefers may be determined using, for example, at least one of purchase history information and search history information of the service user included in the service information about the user. For example, when the service user has a history of purchasing multiple items of a specific brand among the purchased items, the electronic apparatus 100 may determine the specific brand as a preferable brand. Further, for example, when the service user has a history of searching for a specific brand multiple times in relation to the purchased items, the electronic apparatus 100 may determine the specific brand as a preferable brand.

On the other hand, there may be a case in which a product including the item that matches the product characteristic 600a selected by the service user is not presented but the item that matches the product characteristic 600a selected by the service user is expected to be stocked within a certain period of time. That is, in the case in which a product including the item that matches the product characteristic 600a selected by the service user is not presented at the time when the service user searches for the respective product and the item is expected to be stocked within a certain period of time, it is necessary to notify the service user of the date of receipt while presenting the product of the item to the service user.

Thus, in this case, the electronic apparatus 100 according to example embodiments may display, on the first region 600, the product(s) in which the item that matches the product characteristic selected by the service user is expected to be stocked within the certain period of time. The first region 600 according to example embodiments may further include information about each product in which the item that matches the product characteristic selected by the service user is expected to be stocked within the certain period of time (for example, information such as a name, price, delivery date, and the like) (see a region 601a), the date of receipt or the time at which the item that matches the product characteristic selected by the service user is expected to be stocked (see a region 601b), and a restock notification request interface 601c for requesting a notification to the service user at the time of restocking the item.

Even if the search result does not match the search term input by the service user and the product characteristic selected by the service user, the electronic apparatus 100 according to example embodiments may present an item that the service user is likely to purchase, or may provide information on when the service user can purchase an item that matches the product characteristic he/she has selected. This may help the service user to make purchase decision about the item, and may induce the service user to purchase another product.

Figure 7:
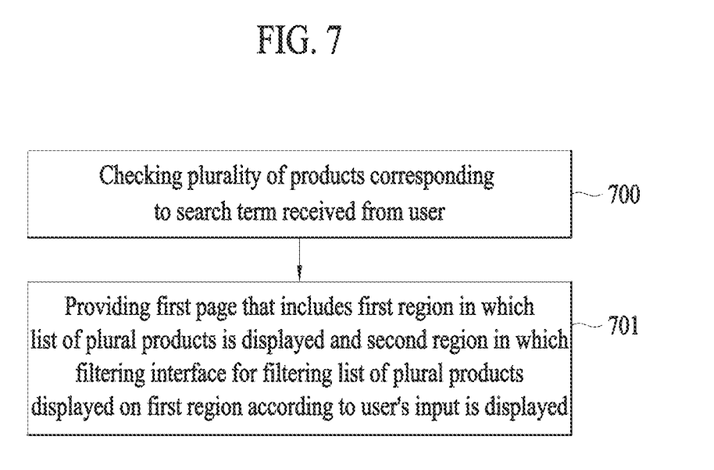
FIG. 7 illustrates an example of an item information providing method according to example embodiments.

FIG. 7 illustrates an example of a method of providing search result information for a provided service using the electronic apparatus 100 according to example embodiments.

An item information providing method according to example embodiments illustrated in FIG. 7 may be carried out in the electronic apparatuses 100 according to example embodiments described with reference to FIGS. 1 to 6. The item information providing method according to example embodiments may include operations 700 and 701.

The electronic apparatus 100 according to example embodiments may check a plurality of products corresponding to a search term received from the service user (in operation 700). Each of the plurality of products according to example embodiments may include at least one or more items that are distinguished from each other based on characteristic information of each product.

The electronic apparatus 100 according to example embodiments may provide a first page that includes a first region in which a list of the plurality of checked products is displayed and a second region in which a filtering interface for filtering the list of the products displayed on the first region according to a service user's input is displayed (in operation 701).

The second region according to example embodiments may further include an icon (the first indicator according to example embodiments) that indicates a detail interface for characteristic information corresponding to the service information about the user among the characteristic information relating to the most-product category. Here, the service information about the user may include information about a size (for example, foot size) of a body portion of the service user.

The filtering interface according to example embodiments may include a list associated with selectable characteristic information determined based on stock information of each item of the plurality of products. Specifically, the filtering interface according to example embodiments may include at least one detail interface configured such that the service user selects characteristic information relating to a category of the most of the plurality of products corresponding to the search term according to example embodiments.

In response to the selection input made by the service user to the selectable characteristic information, the electronic apparatus 100 according to example embodiments may display, on the first region of the first page, a list of products among the plurality of products in which an item that matches the characteristic information corresponding to the selection input is in stock. According to example embodiments, the operation (step) of displaying the list of products in which the item is in stock, may include checking a product identifier of each product corresponding to the search term, checking an item identifier of the item that matches the characteristic information corresponding to the selection input among item identifiers that identify items corresponding to each product identifier, and checking products in each of which the item corresponding to the item identifier is in stock.

The electronic apparatus 100 according to example embodiments may receive the selection input made by the service user to the selectable characteristic information. In response to a request of a detail page of a first product included in the first region, the electronic apparatus 100 according to example embodiments may provide a second page indicating detail information about the item that matches the characteristic information corresponding to the service user's selection input. The electronic apparatus 100 according to example embodiments may perform, for example, some or all of the operations described with reference to FIG. 3.

When there is no product in which the item that matches the characteristic information corresponding to the selection input is in stock, the electronic apparatus 100 according to example embodiments may display, on the first region according to example embodiments, one or more products in which the item is in stock, among the plurality of products. The electronic apparatus 100 according to example embodiments may perform, for example, some or all of the operations described with reference to FIG. 2.

Further, when there is no product in which the item that matches the characteristic information corresponding to the selection input, the electronic apparatus 100 according to example embodiments may display, on the first region of the first page according to example embodiments, one or more products corresponding to a brand the service user prefers among the plurality of products. The electronic apparatus 100 according to example embodiments may perform, for example, some or all of the operations described with reference to FIG. 6.

Further, when there is no product in which the item that matches the characteristic information corresponding to the selection input, the electronic apparatus 100 according to example embodiments may be configured such that information indicating an expected data of stock of the item that matches the characteristic information corresponding to the selection input is displayed on the first region of the first page according to example embodiments. The first region may further include the second interface for notifying the terminal device of the service user of the date of receipt. The electronic apparatus 100 according to example embodiments may perform, for example, some or all of the operations described with reference to FIG. 6.

Throughout the specification, the example embodiment in which an example of the product is a shoe and an example of the characteristic information is a shoe size has been described. However, the present disclosure is not limited thereto. The features in the example embodiments described herein may be applied to search for a product that can be sorted into a plurality of items based on characteristic information within the same product.

Although in the present specification, preferable example embodiments of the present disclosure have been described with reference to the figures and the specific terms have been used, they are merely specific examples disclosed to easily explain the technical content of the present disclosure and further facilitate overall understanding of the present disclosure, and are not intended to limit the scope of the present disclosure. Further, it will be apparent to those skilled in the art that other variations based on the technical ideas of the present disclosure may be made in addition to the example embodiments disclosed herein.

The electronic apparatus or the terminal described herein may include a processor, a memory storing and executing program data, a permanent storage such as a disk drive, a communication port for communicating with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium may include magnetic storage media (for example, read only memory (ROM), random access memory (RAM), floppy disk, or hard disk), optically readable media (for example, compact disk-read only memory (CD-ROM) or digital versatile disk (DVD)), and the like. The computer-readable recording medium may be distributed over computer systems connected to each other via a network, and thus, the computer-readable codes may be stored and executed in a distributed fashion. This medium may be read by the computer, stored in the memory, and executed by the processor.

The present example embodiments may be described in terms of functional block constituent elements and various processing steps. Such functional blocks may be realized by any number of hardware and/or software constituent elements configured to perform specified tasks. For example, embodiments may employ various integrated circuit (IC) components, such as memory elements, processing elements, logic elements, look-up tables, and the like, which may perform a variety of tasks under the control of one or more microprocessors or other control devices. Similar to a case in which the constituent elements are implemented using software programming or software elements, the present example embodiments may be implemented with any programming or scripting language such as C, C++, Java, assembler language, or the like, with the various algorithms being implemented with any combination of data structures, processes, routines or other programming elements. Functional aspects may be implemented in algorithms that are executed on one or more processors. Furthermore, the example embodiments described herein could employ related arts for electronic configuration setting, signal processing and/or data processing and the like. The terms "mechanism," "element," "means," and "configuration" may be used broadly and are not limited to mechanical or physical embodiments. These terms may include meaning of a series of routines of software in association with a processor, for example.

The above-described example embodiments are merely examples and other example embodiments may be implemented within the scope of the following claims.

Further, although in the present specification, preferable example embodiments of the present disclosure have been described with reference to the figures and the specific terms have been used, they are merely specific examples disclosed to easily explain the technical content of the present disclosure and further facilitate overall understanding of the present disclosure, and are not intended to limit the scope of the present disclosure. Further, it will be apparent to those skilled in the art that other variations based on the technical ideas of the present disclosure may be made in addition to the example embodiments disclosed herein.

What is claimed is:

1. A method of providing item search result information for a service provided using an electronic apparatus, the item search result information providing method comprising:
receiving, from a user device, a search term;
determining, based on the search term, a plurality of products corresponding to the search term, wherein each product of the plurality of products includes at least one item, and wherein the at least one item of a product is distinguished from other items of each product based on characteristic information of the at least one item;
generating, based on the determining the plurality of products, a first page displayable on the user device, wherein the first page comprises:
a first region that displays a first list of the plurality of the products;
a second region; and a filtering interface, located in the second region, for filtering the first list of the plurality of products in the first region according to a user input, wherein the filtering interface includes a second list, associated with selectable characteristic information, determined based on stock information of each item of the plurality of products;

sending, based on the generating the first page, the first page to the user device;

receiving, from the user device, user input regarding user interactions with the first page comprising selected characteristic information;

generating, based on received selected characteristic information, a first list of products among the plurality of products, wherein the first list of products matches the received selected characteristic information and are in stock;

determining, based on the received user input, out-of-stock products, wherein the out-of-stock products are products among the plurality of products matching the selected characteristic information corresponding to the user input and are not in stock;

generating, based on the first list of products and the out-of-stock products, a second page displayable on the user device overlapping the first page, wherein the second page comprises:
the first list of products in a first format; and
the out-of-stock products, wherein the out-of-stock products are displayed in a second format different from the first format; and sending, to the user device, the second page.

2. The method of claim 1, wherein generating the second page with the first list of the products which match the selected characteristic information and are in stock includes:
checking a product identifier of each of the items corresponding to the search term; and
checking an item identifier for the item that matches the selected characteristic information among item identifiers that identify items corresponding to each product identifier, and checking the products in which the item corresponding to the item identifier is in stock.

3. The method of claim 2, wherein the filtering interface includes at least one detail interface by which a user selects pieces of characteristic information associated with a category of most products of the plurality of products corresponding to the search term.

4. The method of claim 2, wherein the second region further includes an icon indicating a detail interface for characteristic information corresponding to information about the user among pieces of characteristic information associated with a category of most products,
wherein the information about the user includes information indicating a size of a body portion of the user.

5. The method of claim 1, wherein, when there is no product in which the item that matches the selected characteristic information is in stock, one or more products among the plurality of products in which the item is in stock are displayed in the first region.

6. The method of claim 1, wherein, when there is no product in which the item that matches the selected characteristic information is in stock, one or more products among the plurality of products corresponding to a preferable brand a user prefers are displayed in the first region, and
the preferable brand is determined based on pieces of information indicating an item purchase history and item search history included in the information about the user.

7. The method of claim 6, wherein, when there is no product in which the item that matches the selected characteristic information is in stock, the first region includes a date of receipt of the item that matches the selected characteristic information, and
the first region further includes a second interface configured to provide a notification about the date of receipt to a terminal device of the user.

8. The method of claim 1, further comprising:
providing a second page indicating detail information of the item that matches the selected characteristic information in response to a request of a detail page for a first product included in the first region.

9. An electronic apparatus for providing a service that provides item search result information, the electronic apparatus comprising:
a memory storing at least one program; and
a processor configured to:
receive, from a user device, a search term;
determine, based on the search term, a plurality of products corresponding to the search term, wherein each product of the plurality of products includes at least one item, and wherein the at least one item of a product is distinguished from other items of each product based on characteristic information of the at least one item;
generate, based on the determining the plurality of products, a first page displayable on the user device, wherein the first page comprises:
a first region that displays a first list of the plurality of the products;
a second region; and
a filtering interface, located in the second region, for filtering the first list of the plurality of products in the first region according to a user input, wherein the filtering interface includes a second list, associated with selectable characteristic information, determined based on stock information of each item of the plurality of products;
send, based on the generating the first page, the first page to the user device;
receive, from the user device, user input regarding user interactions with the first page comprising selected characteristic information;
generate, based on received selected characteristic information, a first list of products among the plurality of products, wherein the first list of products matches the received selected characteristic information and are in stock;
determine, based on the received user input, out-of-stock products, wherein the out-of-stock products are products among the plurality of products matching the selected characteristic information corresponding to the user input and are not in stock;
generate, based on the first list of products and the out-of-stock products, a second page displayable on the user device overlapping the first page, wherein the second page comprises:
the first list of products in a first format; and
the out-of-stock products, wherein the out-of-stock products are displayed in a second format different from the first format; and
send, to the user device, the second page.

10. A non-transitory computer-readable storage medium, comprising:
a medium configured to store computer-readable instructions, wherein, when the computer-readable instructions are executed by a processor, the processor executes:
receiving, from a user device, a search term;
determining, based on the search term, a plurality of products corresponding to the search term, wherein each product of the plurality of products includes at least one item, and wherein the at least one item of a product is distinguished from other items of each product based on characteristic information of the at least one item;
generating, based on the determining the plurality of products, a first page displayable on the user device, wherein the first page comprises:
  a first region that displays a first list of the plurality of products;
  a second region; and
  a filtering interface, located in the second region, for filtering the first list of the plurality of products in the first region according to user input, wherein the filtering interface includes a second list, associated with selectable characteristic information, determined based on stock information of each item of the plurality of products;
sending, based on the generating the first page, the first page to the user device;
receiving, from the user device, user input regarding user interactions with the first page comprising selected characteristic information;
generating, based on received selected characteristic information, a first list of products among the plurality of products, wherein the first list of products matches the received selected characteristic information and are in stock;
determining, based on the received user input, out-of-stock products, wherein the out-of-stock products are products among the plurality of products matching the selected characteristic information corresponding to the user input and are not in stock;
generating, based on the first list of products and the out-of-stock products, a second page displayable on the user device overlapping the first page, wherein the second page comprises:
  the first list of products in a first format; and
  the out-of-stock products, wherein the out-of-stock products are displayed in a second format different from the first format; and
sending, to the user device, the second page.

* * * * *